United States Patent
Turner et al.

[19]

[11] Patent Number: 6,102,634
[45] Date of Patent: *Aug. 15, 2000

[54] MASONRY DRILL BIT

[75] Inventors: Geoff Turner, School Aycliffe, United Kingdom; Rudi Birk, Altenstadt, Germany

[73] Assignee: Black & Decker Inc., Newark, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/686,010

[22] Filed: Jul. 25, 1996

[30] Foreign Application Priority Data

Jul. 29, 1995 [GB] United Kingdom ................... 9515594

[51] Int. Cl.$^7$ ..................................................... B23B 51/02
[52] U.S. Cl. ......................... 408/224; 175/389; 175/395; 175/415; 175/420.1; 408/230
[58] Field of Search ................................... 408/223, 224, 408/225, 228, 230; 175/389, 392, 394, 395, 415, 420.1, 323

[56] References Cited

U.S. PATENT DOCUMENTS

| | | |
|---|---|---|
| 1,017,352 | 2/1912 | Wagner . |
| 2,237,901 | 10/1938 | Chun . |
| 2,294,969 | 9/1942 | Engvall et al. . |
| 2,332,295 | 10/1943 | Bouchal . |
| 2,600,286 | 6/1952 | Weiland . |
| 2,673,714 | 3/1954 | Hargrave . |
| 2,865,606 | 12/1958 | Farmer . |
| 2,879,036 | 3/1959 | Wheeler . |
| 3,199,381 | 8/1965 | Mackey, Sr. . |
| 3,592,555 | 7/1971 | Mackey, Sr. . |
| 3,674,101 | 7/1972 | Chromy ................................ 175/420.1 |
| 4,503,920 | 3/1985 | Clement . |
| 4,568,227 | 2/1986 | Hogg ........................................ 408/224 |
| 4,729,441 | 3/1988 | Peetz et al. . |
| 4,878,788 | 11/1989 | Wakihira et al. . |
| 4,924,953 | 5/1990 | Moser . |
| 4,968,193 | 11/1990 | Chaconas et al. . |
| 4,984,944 | 1/1991 | Pennington, Jr. et al. . |
| 5,056,967 | 10/1991 | Hageman . |
| 5,181,811 | 1/1993 | Hosoi . |
| 5,269,387 | 12/1993 | Nance . |
| 5,375,672 | 12/1994 | Peay et al. . |
| 5,423,640 | 6/1995 | Lindblom et al. . |
| 5,570,978 | 11/1996 | Rees et al. ............................. 408/224 |

FOREIGN PATENT DOCUMENTS

| | | |
|---|---|---|
| 0088037 | 9/1983 | European Pat. Off. . |
| 0137898 | 9/1984 | European Pat. Off. . |
| 0123878 | 11/1984 | European Pat. Off. . |
| 0097879 | 10/1990 | European Pat. Off. . |
| 2583667 | 12/1986 | France . |
| 602663 | 8/1934 | Germany ............................. 408/223 |
| 2422452 | 11/1975 | Germany . |
| 2841679 | 4/1980 | Germany . |
| 3123048 | 8/1982 | Germany . |
| 8303526 | 6/1983 | Germany . |
| 3316193 | 11/1984 | Germany . |
| 3538191 | 4/1987 | Germany ............................. 175/394 |
| 4117486 | 12/1992 | Germany . |
| 244311 | 9/1992 | Japan . |
| 1238905 | 6/1986 | U.S.S.R. . |
| 948107 | 11/1961 | United Kingdom . |
| 1270347 | 12/1972 | United Kingdom . |
| 1378342 | 12/1974 | United Kingdom . |
| 2193913 | 2/1988 | United Kingdom . |
| 2201910 | 9/1989 | United Kingdom . |

*Primary Examiner*—Daniel W. Howell
*Attorney, Agent, or Firm*—Harness, Dickey & Pierce, P.L.C.

[57] ABSTRACT

A masonry drill bit 1 having an active diameter of D, comprising a shaft 3 and a tip 5 for engaging a workpiece, the tip 5 including a central portion 11 extending ahead of an outer portion 13, wherein the central portion 11 has a width of at least 0.25 D and is shaped to act as a chisel during percussion drilling, and wherein the outer portion 13 is shaped to cut a workpiece as the drill bit rotates. By virtue of the drill bit tip 5 configuration as described and claimed herein, a masonry drill bit 1 having improved performance is provided.

14 Claims, 5 Drawing Sheets

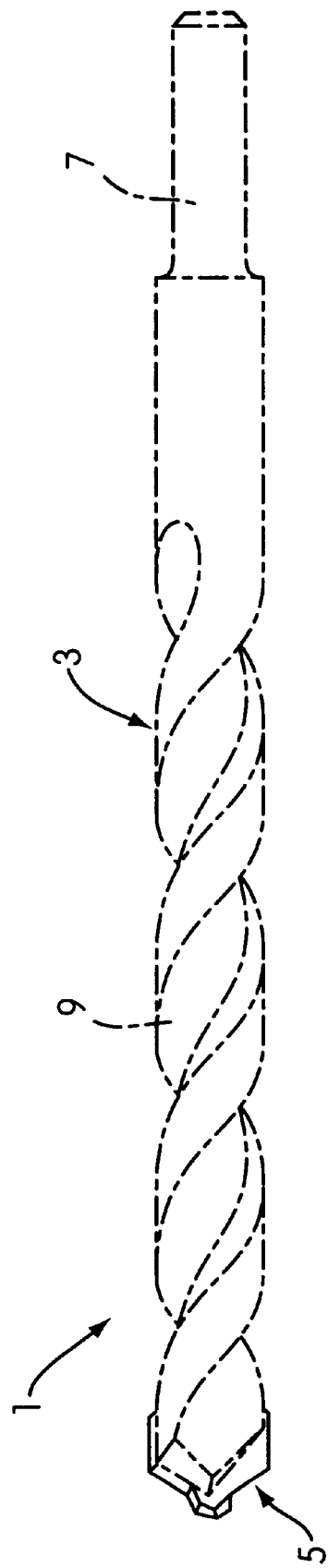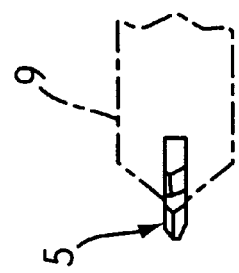

MASONRY DRILL BIT

This invention relates to masonry drill bits, and in particular to a masonry drill bit which is usable with rotary and percussion drills and electro-pneumatic hammers.

In known masonry drill bits, a hard metal or carbide tip providing edges for drilling concrete, brick, natural stone or the like is brazed into an end of a drill bit shaft. The shaft is usually a helically twisted steel web having a shank at its free end for insertion into the chuck or tool holder of a drill or hammer. The cutting edges of the drill bit tip usually extend in a straight uninterrupted line from the forward extremity of the drill bit to the outer diameter of the drill bit. These cutting edges also usually extend slightly rearwardly from the centre to the outside of the drill bit.

GB-1270347 discloses a masonry drill bit which includes a pilot tip in the form a forward extension of the drill bit tip. This pilot tip is included to guide the drill bit into a workpiece and to assist in preventing the drill bit from being forced off-line when the drill bit strikes a stone or pebble in the masonry being drilled.

Although it is important for a masonry drill bit to produce a hole in a workpiece as quickly as possible, market research has indicated that the life of the drill bit and a reduction in edge chipping of the hole are considered by consumers to be far more important than a saving in the time needed to drill a hole with the drill bit. With this in mind, the present applicant has developed a novel masonry drill bit which is efficient at cutting holes in workpieces and, in general, has a longer life than equivalent drill bits currently on the market.

In accordance with the foregoing, the present invention provides a masonry drill bit having an active diameter of D, comprising a shaft and a tip for engaging a workpiece, the tip including a central portion extending ahead of an outer portion, wherein the central portion has a width of at least 0.25 D and is shaped to act as a chisel during percussion drilling, and wherein the outer portion is shaped to cut a workpiece as the drill bit rotates.

By including the central portion, which has a significant width compared to the total active diameter of the drill bit, a substantial chiselling action is produced, during use, by the drill bit as the drill bit is reciprocated by a percussion drill or hammer. Furthermore, by providing a stout central portion, failure of the drill bit is less likely to occur.

Preferably the width of the central portion is between 0.25 D and 0.75 D. The particular relative width of the central portion is dictated by the actual active diameter of the masonry drill bit. For example, if the active diameter is small, such as 4 mm, the relative width of the central portion is preferably high, such as 0.75 D. If, however, the active diameter of the drill bit is large, such as 20 mm, the relative width of the central portion is preferably smaller, such as about 0.33 D. This is because, if the relative width of the central portion is large for a drill bit having a large active diameter, the edge of the hole produced by the drill bit may become chipped or otherwise damaged during drilling.

The central portion preferably includes a central chisel edge defined by two pairs of flanks inclined away from the chisel edge. By including a flank on the leading edges of the central portion, such that the central portion has negative leading edges, failure of the drill bit tip is less likely to occur.

Preferably the flanks of each pair are inclined at different angles. More preferably, one flank of each pair is inclined at between 30° and 40° to a plane perpendicular to the axis of the shaft, ideally about 35°, and the other flank of each pair is inclined at between 50° and 60°, ideally about 55°, to the same plane. The leading flank of each pair is the flank preferably inclined at about 55°.

Preferably the outer portion comprises two symmetrical cutting edges on opposite sides of the central portion. Further, the cutting edges are preferably inclined rearwardly relative to the central portion. More preferably, an angle of between 110° and 130° is formed between the two cutting edges in a plane accommodating the shaft. As a result, a cleaner edge to the hole being drilled can be achieved.

Preferably each cutting edge is defined by a flat which extends rearwardly of the cutting edge at an angle of between 35° and 40° relative to a plane perpendicular to the axis of the shaft.

In one embodiment, the tip may be tungsten carbide or some other equivalent material.

In an alternative embodiment, the outer portion may be tungsten carbide and the central portion may be some other material, such as steel.

If the central portion is steel, it is preferably formed integrally with the shaft of the drill bit. Of course, the central portion may be manufactured from a different material to the shaft, if it is more appropriate to do so.

The shaft preferably includes an helical web for assisting removal of debris during drilling, as in most normal masonry drill bits.

Specific embodiments of the present invention are now described, by way of example only, with reference to the accompanying drawings, in which:

FIG. 1 is a front view of a masonry drill bit;

FIG. 2 is a side view of the forward end of the drill bit of FIG. 1;

Figure 1B:
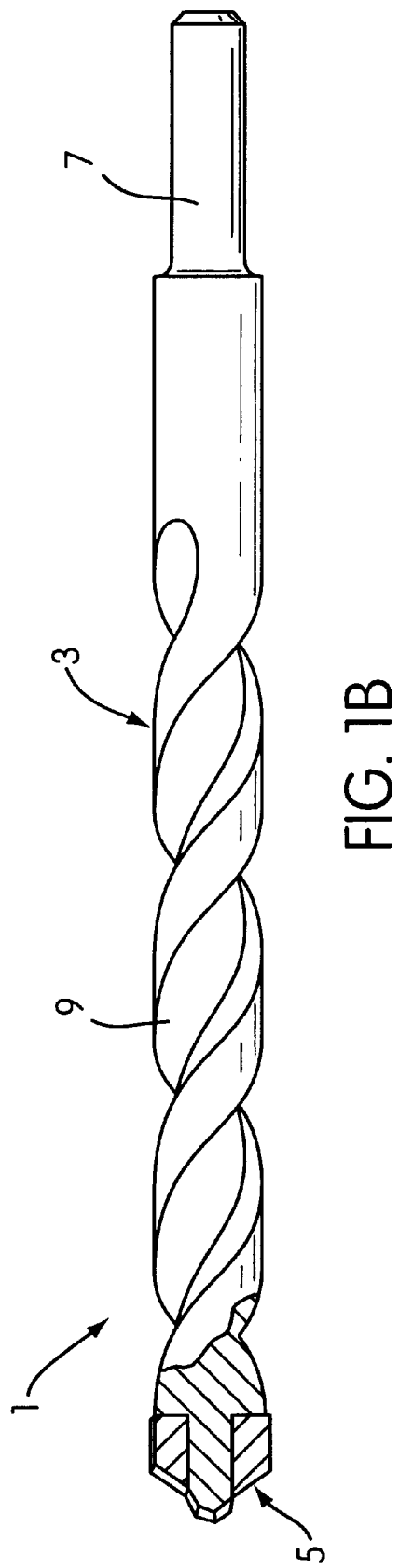
FIG. 1B is a front view partially in section of a masonry bit in accordance with the present invention.

With reference to FIGS. 1 and 2 of the drawings, a masonry drill bit 1 according to the present invention comprises a shaft 3 and a drill bit tip 5. The shaft 3 includes a shank 7 for insertion in a chuck or tool holder (not shown) of a drill or hammer and an helically twisted steel web 9 extending in the forward direction from the shank 7. The web 9 may be fluted as shown or simply straight, depending on the required application. The end of the web 9 is forked to receive the drill bit tip 5, as shown in FIG. 2. The drill bit tip 5 is, in the first embodiment, made from cemented tungsten carbide and is fixed to the web 9 of the steel shaft 3 by brazing. Alternatively, the tip 5 could perhaps be attached by welding or some other mechanical fixing arrangement, possibly without the web 9 being forked.

The drill bit tip 5 will now be described in more detail with reference to FIGS. 3–6 of the accompanying drawings.

As can be seen from FIGS. 3–6, the drill bit tip 5 has a diameter D and comprises a central portion 11 and an outer portion 13. The central portion 11, which has a width B equal to or greater than 0.25 D, is shaped and configured to act as a chisel when the drill bit 1 is being used with a percussion drill or hammer. Accordingly, a central region on a hole being drilled is pounded or chiselled with the central portion 11 of the drill bit 1, thereby causing cracks to propagate in the workpiece. Disintegration of the centre of the hole in the workpiece thereby occurs as drilling progresses. Upon contact of the outer portion 13 of the drill bit 1 with the workpiece, the outer portion 13 cuts the remainder of the hole in the workpiece. By virtue of this two action drilling process, a very neat and accurate hole can be produced in a workpiece.

Figure 4:
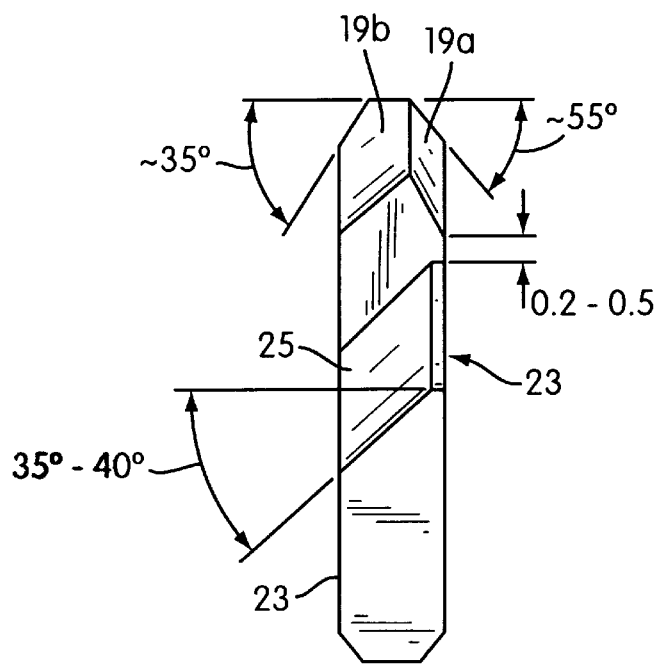
FIG. 4 is a side view of the drill bit tip of FIG. 3.

The central portion 11 of the drill bit tip 5 comprises a chisel edge 15 which is formed by two pairs of flanks 17a, b and 19a, b. As will be appreciated, the drill bit tip 5 rotates in the direction of arrow A in FIG. 5 during use. s a result, the leading edge of the central portion 11 is defined by flanks 17a, 19a. These flanks 17a, 19a are inclined at an angle of about 55° to a plane perpendicular to the axis of the drill bit 1, as shown in FIG. 4. The trailing flanks 17b, 19b are not so steep, being inclined at about 35° to the plane perpendicular to the axis of the drill bit 1, as also shown in FIG. 4. By making the leading flanks 17a, 19a inclined to the axis of the drill bit 1, less damage is caused to the central portion 11 during drilling.

Although the chisel edge 15 is made relatively sharp, in the embodiment shown in the drawings it has a very slight curvature. This curvature helps to avoid damage being inflicted on the edge 15 during use, which damage may cause the drill bit 1 to become unstable.

Figure 3:
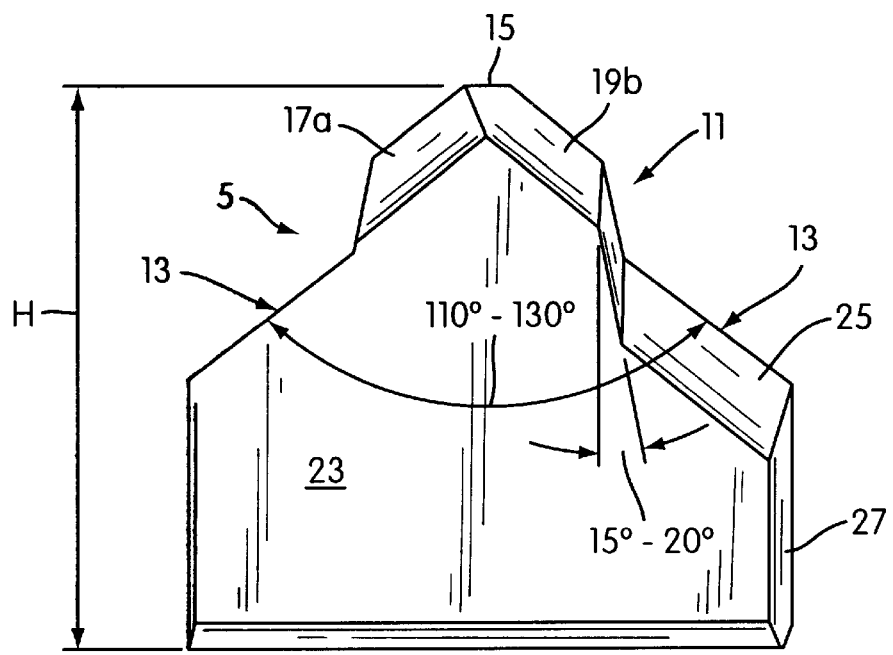
FIG. 3 is a schematic front view of a masonry drill bit tip for inclusion in a drill bit according to the present invention.

The outer portion 13 of the drill bit tip 5 comprises two cutting edges 21 formed between the front and rear faces 23 of the tip 5 and inclined flats 25 which extend rearwardly of the cutting edges 21. Once again, however, the cutting edges 21 are provided with slight curvatures, thereby avoiding catastrophic damage being caused to the cutting edges 21 during use. As shown in FIG. 3, the cutting edges 21 are inclined rearwardly from the central portion 11 and define an angle of between 100° and 130° in the plane of the shaft 3.

Figure 5:
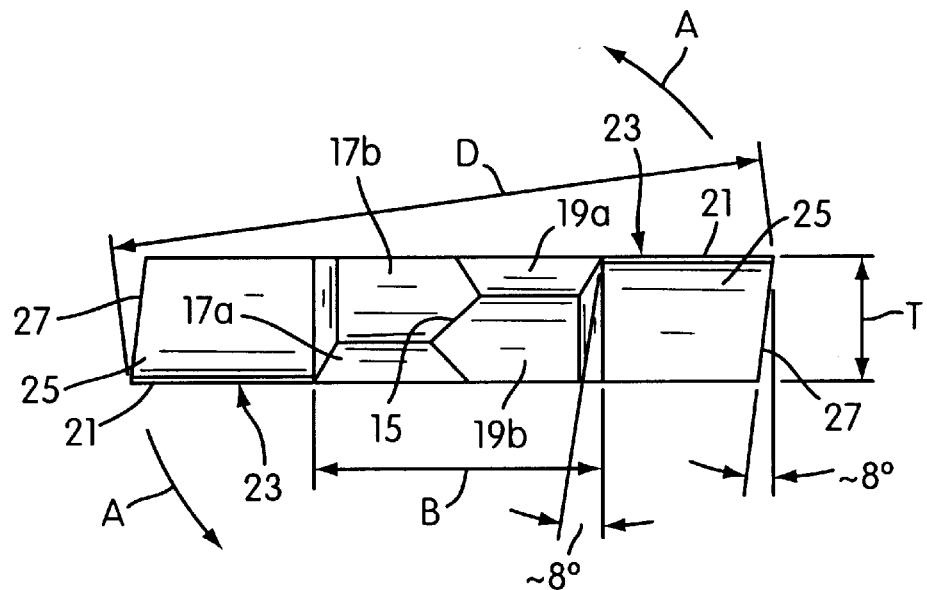
FIG. 5 is a plan view of the drill bit tip of FIGS. 3 and 4.
Figure 6:
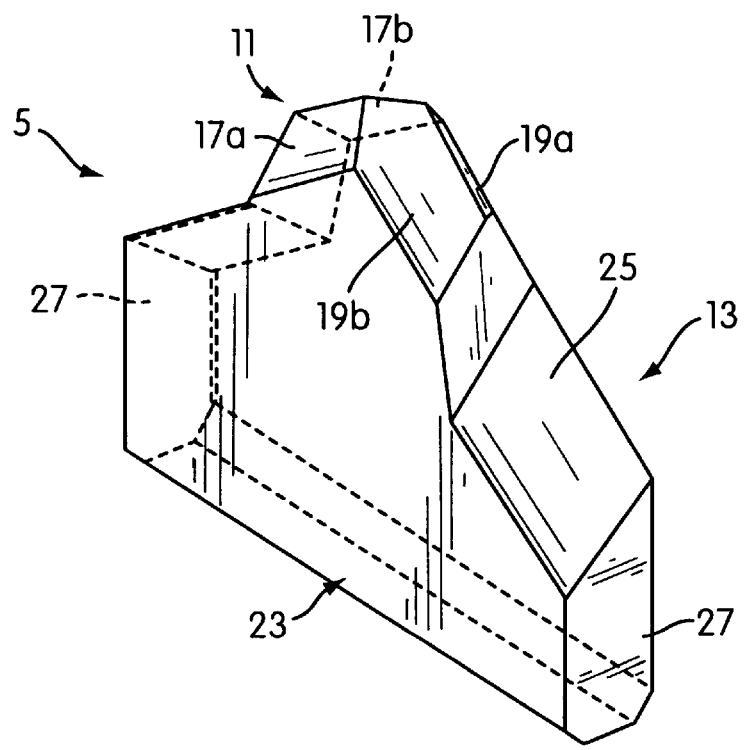
FIG. 6 is a perspective view of the drill bit tip of FIGS. 3, 4 and 5.

To avoid fouling of the drill bit 1, during use, the outer sides 27 of the drill bit tip 5 taper inwardly from the cutting edges 21, as shown in FIG. 5. This arrangement helps to allow the drill bit tip 5 to produce an accurate and cleanly cut hole in a workpiece. Similarly, the central portion 11 is tapered inwardly away from the leading surfaces 17a, 19a of the central portion 11.

Figure 7:
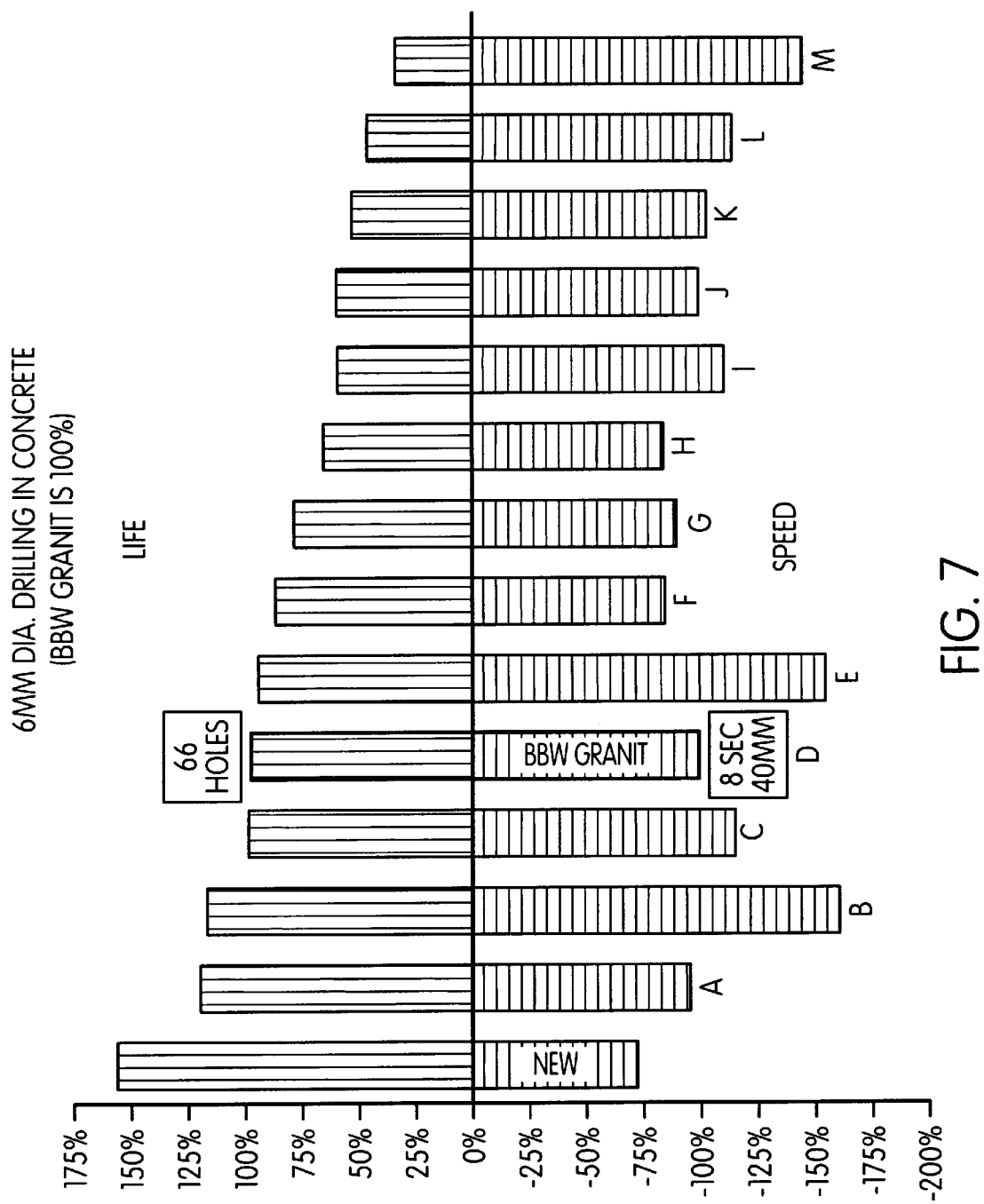
FIG. 7 is a graph comparing the life and speed of cut of a drill bit according to the present invention with various prior art drill bits currently on the market.

A variety of dimensions for drill bit tips 5 for masonry drill bits 1 according to the present invention are given in Table A hereinbelow. As will be appreciated, these dimensions are simply examples which result in a masonry drill bit 1 according to the present invention, which drill bits 1 are novel and inventive over the prior art. With this in mind, FIG. 7 shows a graph which compares the life of a drill bit 1 according to the present invention against a number of competing drill bits (A–M) currently in the market place. Each drill bit, which had a diameter of 6 mm, was used continuously to drill 40 mm holes in concrete until the drill bit failed to meet the required parameters of the controlled test. A life of 100% corresponds to 66 holes, which is the number of holes produced by a prior art Black & Decker "Granit" masonry drill bit (D). Further, the average speed of drilling each hole is compared against this same prior art drill bit, wherein the average time for each hole was 8 seconds. On comparing the results of the tests as shown in FIG. 7, it will be noted that the masonry drill bit (NEW) according to the present invention achieved a lifetime more than 50% better than that of the standard set by the "Granit" drill bit. Further, this new drill bit produced the best average life of all those tested. Similar results were obtained for 8 mm diameter and 12 mm diameter drill bits.

As will be appreciated, the inclusion of the central portion 11, which has a significant width compared to the active diameter D of the drill bit 1, results in a distinct improvement in the performance of the drill bit 1. Further, although the first embodiment described herein is produced using a drill bit tip 5 having a combined central portion 11 and outer portion 13, other embodiments according to the present invention may be formed as follows.

In a second embodiment, the central portion 11 is formed integrally with the steel shaft 3 of the drill bit 1 and the cutting edges 21 of the outer portion 13 are attached to the shaft 3 by brazing or other means. Accordingly, the central portion 11 is steel, which is found to be a better material for chiselling than tungsten carbide, and the outer portion 13 is either still tungsten carbide or any other appropriate material. Hence in this second embodiment the drill bit tip 5 is not formed as a single piece.

In a third embodiment, the central portion 11 is formed of one appropriate material, possibly steel, and the outer portion 13 is formed of a second material, such as tungsten carbide, prior to the complete tip 5 being attached to a web 9 of a shaft 3. Many other arrangements which result in a masonry drill bit according to the present invention can, of course, be envisaged by those skilled in the art.

It will of course be understood that the present invention has been described above purely by way of example, and that modifications of detail can be made within the scope of the invention.

TABLE A

| Tip Diameter D | | Tip Height (mm) | Tip Thickness (mm) | Point Width (mm) |
|---|---|---|---|---|
| EURO (mm) | ANSI (inch) | H | T | B |
|  | 1/8 | 4.00 | 0.80 | 2.5 |
| 4 | 5/32 | 4.00 | 1.00 | 3.0 |
| 4.5 |  | 4.50 | 1.00 | 3.2 |
| 5 | 3/16 | 5.10 | 1.20 | 3.3 |
| 5.5 |  | 5.40 | 1.20 | 3.4 |
| 6 |  | 5.40 | 1.40 | 3.5 |
| 6.5 | 1/4 | 5.90 | 1.40 | 3.5 |
| 7 |  | 6.10 | 1.60 | 3.6 |
| 7.5 |  | 6.10 | 1.60 | 3.6 |
| 8 | 5/16 | 6.65 | 1.80 | 3.8 |
| 8.5 |  | 6.65 | 1.80 | 3.8 |
| 9 |  | 7.05 | 2.00 | 3.8 |
|  | 3/8 | 7.65 | 2.00 | 3.8 |
| 10 |  | 7.65 | 2.00 | 3.8 |
| 11 |  | 8.15 | 2.00 | 3.8 |
|  | 7/16 | 8.65 | 2.00 | 3.8 |
| 12 |  | 9.15 | 2.00 | 4.0 |
| 13 | 1/2 | 9.65 | 2.20 | 4.3 |
| 14 |  | 9.95 | 2.50 | 4.7 |
| 15 |  | 10.65 | 2.50 | 5.0 |
| 16 |  | 10.65 | 2.50 | 5.3 |
|  | 5/8 | 10.75 | 2.50 | 5.5 |
| 18 |  | 11.25 | 2.80 | 6.0 |
|  | 3/4 | 12.95 | 3.20 | 6.4 |
| 20 |  | 13.25 | 3.20 | 6.7 |
|  | 7/8 | 14.25 | 3.20 | 7.3 |
|  | 1 | 14.50 | 4.00 | 8.6 |

We claim:

1. A masonry drill bit having an active diameter of D, comprising a shaft and a tip for engaging a workpiece, the tip including a central portion extending ahead of an outer portion and defining an axis of rotation, wherein the central portion has a width of at least 0.25 D and said central portion includes a central chisel edge defined by at least one pair of flanks on the same side of said axis of rotation inclined away from the chisel edge acting as a chisel during percussion drilling, and wherein the outer portion is shaped to cut a workpiece as the drill bit rotates.

2. A drill bit as claimed in claim 1, wherein the width of the central portion is between 0.33 D and 0.75 D.

3. A drill bit as claimed in claim 1, wherein said central chisel edge being defined by two pairs of flanks inclined away from the chisel edge.

4. A drill bit as claimed in claim 3, wherein the flanks of each pair are inclined at different angles.

5. A drill bit as claimed in claim 4, wherein one flank of each pair is inclined at between 30° and 40° to the chisel edge.

6. A drill bit as claimed in claim 4, one flank of each pair is inclined at between 50° and 60° to the chisel edge.

7. A drill bit as claimed in claim 1, the outer portion comprises two symmetrical cutting edges on opposite sides of the central portion.

8. A drill bit as claimed in claim 7, wherein the cutting edges are inclined rearwardly relative to the central portion.

9. A drill bit as claimed in claim 8, wherein an angle of between 110° and 130° is formed between the two cutting edges in a plane of the shaft.

10. A drill bit as claimed in claim 7, wherein each cutting edge is defined by a flat which extends rearwardly from the cutting edge at an angle of between 35°–40° relative to a plane perpendicular to the axis of the shaft.

11. A drill bit as claimed in claim 1, the tip is tungsten carbide.

12. A drill bit as claimed in claim 1, the shaft includes an helical web for assisting removal of debris during drilling.

13. A drill bit as claimed in claim 1, wherein the outer portion is tungsten carbide and the central portion is steel.

14. A drill bit as claimed in claim 13, wherein the central portion is formed integrally with the shaft.

* * * * *